United States Patent
Aoyagi et al.

(10) Patent No.: US 8,868,084 B2
(45) Date of Patent: Oct. 21, 2014

(54) MOBILE COMMUNICATION TERMINAL, MOBILE COMMUNICATION SYSTEM, AND MOBILE COMMUNICATION METHOD

(75) Inventors: Kenichiro Aoyagi, Yokosuka (JP); Masafumi Masuda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/512,703

(22) PCT Filed: Nov. 30, 2010

(86) PCT No.: PCT/JP2010/071396
§ 371 (c)(1),
(2), (4) Date: Jul. 31, 2012

(87) PCT Pub. No.: WO2011/065572
PCT Pub. Date: Jun. 3, 2011

(65) Prior Publication Data
US 2012/0309396 A1 Dec. 6, 2012

(30) Foreign Application Priority Data
Nov. 30, 2009 (JP) ................... 2009-272446

(51) Int. Cl.
*H04W 36/00* (2009.01)
(52) U.S. Cl.
USPC ........... 455/444; 455/436; 455/437; 455/438; 455/439
(58) Field of Classification Search
CPC ..... H04W 36/04; H04W 36/08; H04W 36/10; H04W 36/12; H04W 36/14; H04W 36/32
USPC ......................................................... 455/444
See application file for complete search history.

(56) References Cited

U.S. PATENT DOCUMENTS

| 2009/0264134 | A1 | 10/2009 | Xu et al. | |
|---|---|---|---|---|
| 2011/0111749 | A1* | 5/2011 | Kim et al. | 455/423 |
| 2011/0194530 | A1* | 8/2011 | Tinnakornsrisuphap et al. | 370/331 |
| 2011/0237252 | A1* | 9/2011 | Kim et al. | 455/434 |
| 2011/0237261 | A1* | 9/2011 | Meshkati et al. | 455/438 |

FOREIGN PATENT DOCUMENTS

| JP | 2007 150476 | 6/2007 |
|---|---|---|
| JP | 2009 124671 | 6/2009 |
| JP | 2009 260448 | 11/2009 |

OTHER PUBLICATIONS

Japanese Office Action issued Apr. 2, 2013 in Patent Application No. 2011-543368 with English Translation.
International Search Report Issued Feb. 1, 2011 in PCT/JP10/71396 Filed Nov. 30, 2010.
Japanese Office Action issued Dec. 3, 2013 in Patent Application No. 2011-543368 with English Translation.

\* cited by examiner

*Primary Examiner* — Mazda Sabouri
(74) *Attorney, Agent, or Firm* — Oblon, Spivak, McClelland, Maier & Neustadt, L.L.P.

(57) ABSTRACT

UE10 includes a detection unit 12 configured to detect a specific cell provided to the first communication system and a control unit 13 configured to start measurement of the second cell or cell reselection from the first cell to the second cell in response to detection of the specific cell. The specific cell has a service area having the same range as a service area of the second cell.

11 Claims, 7 Drawing Sheets

MOBILE COMMUNICATION TERMINAL, MOBILE COMMUNICATION SYSTEM, AND MOBILE COMMUNICATION METHOD

TECHNICAL FIELD

The present invention relates to a mobile communication terminal configured to perform cell reselection and handover/redirection between a first communication system and a second communication system and also to a mobile communication system and a mobile communication method.

BACKGROUND ART

There is known a technique to cause a mobile communication terminal to perform cell reselection from a first communication system having a first cell such as a macrocell to a second communication system having a second cell such as a CSG cell or a femtocell (Patent Document 1, for example).

In addition, there is known a technique to prompt a mobile communication terminal to perform cell reselection from the first communication system to the second communication system by using information or the like broadcasted from the first communication system.

PRIOR ART DOCUMENT

Patent Document

Patent Document 1: Published Japanese Translation of PCT International Application No. 2009-124671

SUMMARY OF THE INVENTION

Here, it is conceivable that the service area of the first cell provided to the first communication system does not completely overlap with the service area of the second cell provided to the second communication system. Specifically, it is conceivable that the mobile communication terminal is not within the service area of the second cell when starting measurement of the second cell in accordance with the information broadcasted from the first cell.

In the case described above, the mobile communication terminal performs lengthy measurement and unnecessarily consumes the battery of the mobile communication terminal.

Thus, the present invention has been made in view of the aforementioned problem and aims to provide a mobile communication terminal, a mobile communication system and a mobile communication method each of which makes it possible to appropriately perform cell reselection between the first communication system and the second communication system while suppressing battery consumption.

A mobile communication terminal according to the first feature of the present invention is configured to perform cell reselection between a first cell and a second cell in a mobile communication system including a first communication system having the first cell and a second communication system having the second cell, the mobile communication terminal includes a detection unit configured to detect a specific cell provided to the first communication system; and a control unit configured to start measurement of the second cell or cell reselection from the first cell to the second cell in response to detection of the specific cell. The specific cell has a service area having the same range as a service area of the second cell.

In the first feature, upon detection of the specific cell, the control unit may start cell reselection from the first cell to the second cell in accordance with notification information broadcasted from the specific cell, and the notification information may include information for prompting cell reselection from the first cell to the second cell.

In the first feature, the control unit may perform handover from the first cell to the second cell by a handover procedure upon detection of the specific cell while the mobile communication terminal is in a connected state with the first cell.

A mobile communication system according to the second feature of the present invention is configured to control a mobile communication terminal connectable to a first communication system having a first cell and a second communication system having a second cell. The specific cell has a service area having the same range as a service area of the second cell, the mobile communication system comprising a notification information transmission unit configured to transmit notification information toward a service area formed by the specific cell provided to the first communication system, the notification information including an information element required for the mobile communication terminal to start measurement of the second cell or cell reselection from the first cell to the second cell.

In the second feature, the mobile communication system may further include a cell reselection instruction unit configured to instruct the mobile communication terminal to perform handover from the first cell to the second cell by a handover procedure upon detection of the specific cell by the mobile communication terminal while the mobile communication terminal is in a connected state with the first cell.

A mobile communication method according to the third feature of the present invention is for controlling a mobile communication terminal connectable to a first communication system having a first cell and a second communication system having a second cell. The specific cell has the same range as a service area of the second cell as its service area, the method including the steps of: transmitting notification information by a mobile communication system toward a service area formed by the specific cell provided to the first communication system, the notification information including an information element required for the mobile communication terminal to start measurement of the second cell or cell reselection from the first cell to the second cell; and starting by the mobile communication terminal, measurement of the second cell or cell reselection from the first cell to the second cell in response to detection of the notification information in the service area formed by the specific cell provided to the first communication system.

MODE FOR CARRYING OUT THE INVENTION

Hereinafter, a description will be given of a mobile communication system according to an embodiment of the present invention with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other as a matter of course.

[Summary of Embodiment]

A mobile communication terminal according to the embodiment is configured to perform cell reselection between a first cell and a second cell in a mobile communication system including a first communication system having the first cell and a second communication system having the second cell. The mobile communication terminal includes: a detection unit configured to detect a specific cell provided to the first communication system; and a control unit configured to start measurement of the second cell or cell reselection from the first cell to the second cell in response to detection of a specific cell. The specific cell has a service area having the same range as the service area of the second cell.

In the embodiment, the specific cell has a service area having the same range as the service area of the second cell, and the mobile communication terminal starts measurement of the second cell or cell reselection from the first cell to the second cell in response to detection of the specific cell. Accordingly, lengthy measurement of a second cell is prevented, and cell reselection between the first communication system (first cell) and the second communication system (first cell) can be appropriately performed while battery consumption is suppressed.

Note that, the statement "the specific cell has a service area having the same range as the service area of the second cell" means that the specific cell has a coverage having a comparably-sized area to the service area formed by the second cell. Specifically, the size of the service area formed by the specific cell and the size of the service area formed by the second cell do not necessarily have the same range. Thus, their coverages may be somewhat displaced from each other, or the size of the service area of the specific cell may be somewhat smaller than the size of the service area formed by the second cell.

[First Embodiment]

(Configuration of Mobile Communication System)

Figure 1:
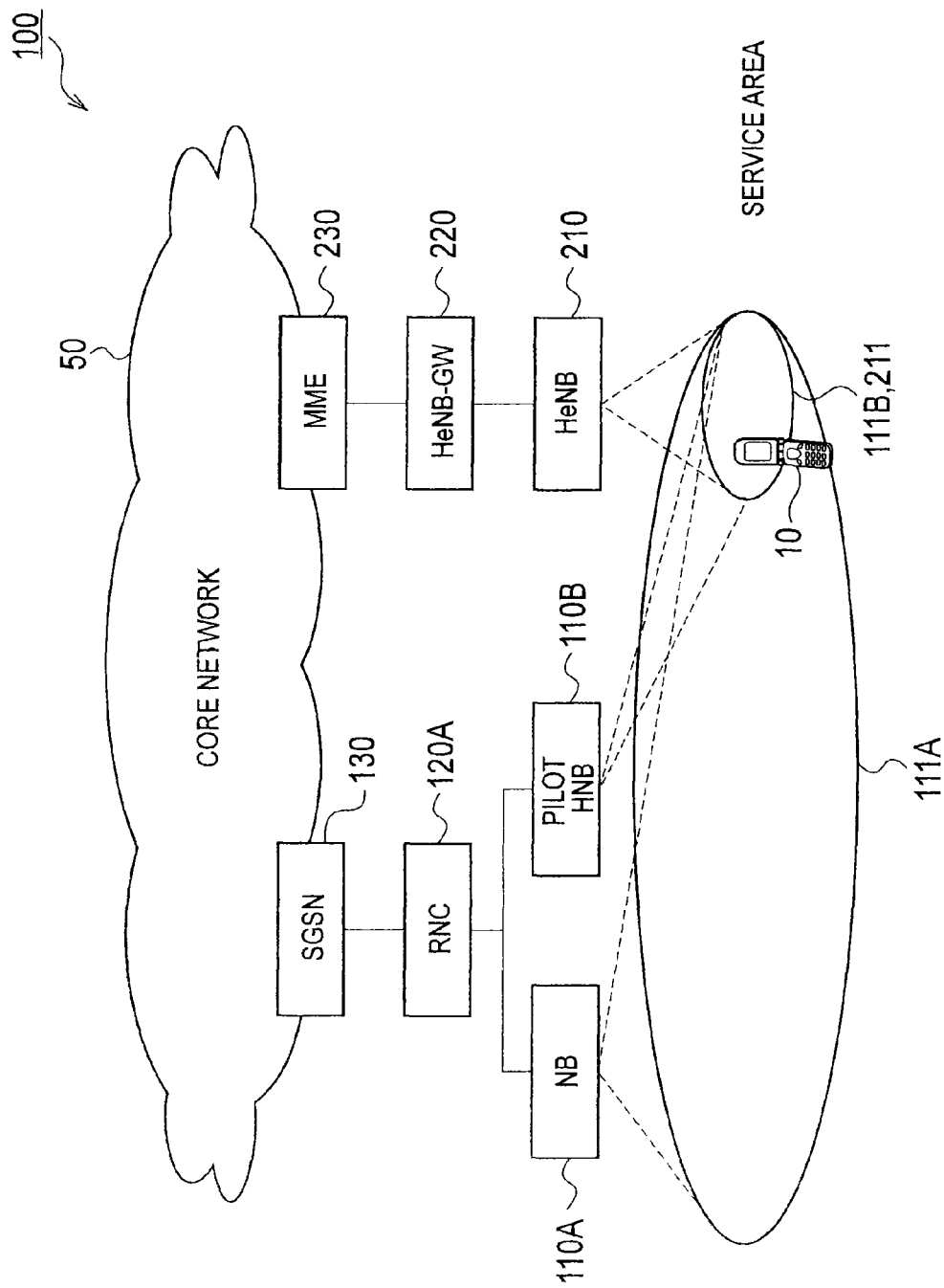
FIG. 1 is a diagram showing a mobile communication system 100 according to a first embodiment.

Hereinafter, a description will be given of a configuration of a mobile communication system according to a first embodiment with reference to the drawings. FIG. 1 is a diagram showing a mobile communication system 100 according to the first embodiment.

As shown in FIG. 1, the mobile communication system 100 includes a communication terminal device 10 (hereinafter, UE 10) and a core network 50. In addition, the mobile communication system 100 includes a first communication system and a second communication system.

The first communication system is a communication system supporting UMTS (Universal Mobile Telecommunication System), for example. The first communication system includes a base station 110A (hereinafter, NB 110A), a pilot home base station 110B (hereinafter, pilot HNB 110B), an RNC 120A and an SGSN 130.

The second communication system is a communication system supporting LTE (Long Term Evolution), for example. The second communication system includes a home base station 210 (hereinafter, HeNB 210), a home base station gateway 220 (hereinafter, HeNB-GW 220) and an MME 230, for example.

The UE 10 is a device (User Equipment) configured to be capable of cell reselection between the first communication system and the second communication system. The UE 10 has a function to perform radio communications with the NB 110A and also has a function to perform radio communications with the HeNB 210, for example.

The NB 110A is assigned a service area 111A and is a device (Node B) configured to perform radio communications with a UE 10 present in the service area 111A.

The pilot HNB 110B is assigned a service area 111B and is a device (Home Node B) configured to broadcast notification information (SIB1; System Information Block type 1, for example) in such a manner that the notification information should arrive at a UE 10 present in the service area 111B. Note that, the pilot HNB 110B may be configured to perform radio communications with a UE 10 present in the service area 111B.

The RNC 120A is connected to the NB 110A and is a device (Radio Network Controller) configured to establish a radio connection (RRC Connection) with a UE 10 present in the service area 111A. The RNC 120A may be connected to the pilot HNB 110B and may be configured to establish a radio connection with a UE 10 present in the service area 111B.

The SGSN 130 is a device (Serving GPRS Support Node) configured to perform packet switching in the packet switched domain. The SGSN 130 is provided in the core network 50. Although illustration is omitted in FIG. 1, a device (MSC; Mobile Switching Center) configured to perform circuit switching in the circuit switched domain may be provided in the core network 50.

The HeNB 210 is assigned a service area 211 and is a device (Home evolved Node B) configured to perform radio communications with a UE 10 present in the service area 211.

The HeNB-GW 220 is connected to the HeNB 210 and is a device (Home evolved Node B Gateway) configured to manage the HeNB 210.

The MME 230 is connected to the HeNB 210 via the HeNB-GW 220 and is a device (Mobility Management Entity) configured to manage the mobility of a UE 10 that establishes a radio connection with the HeNB 210.

(Configuration of Cells)

Figure 2:
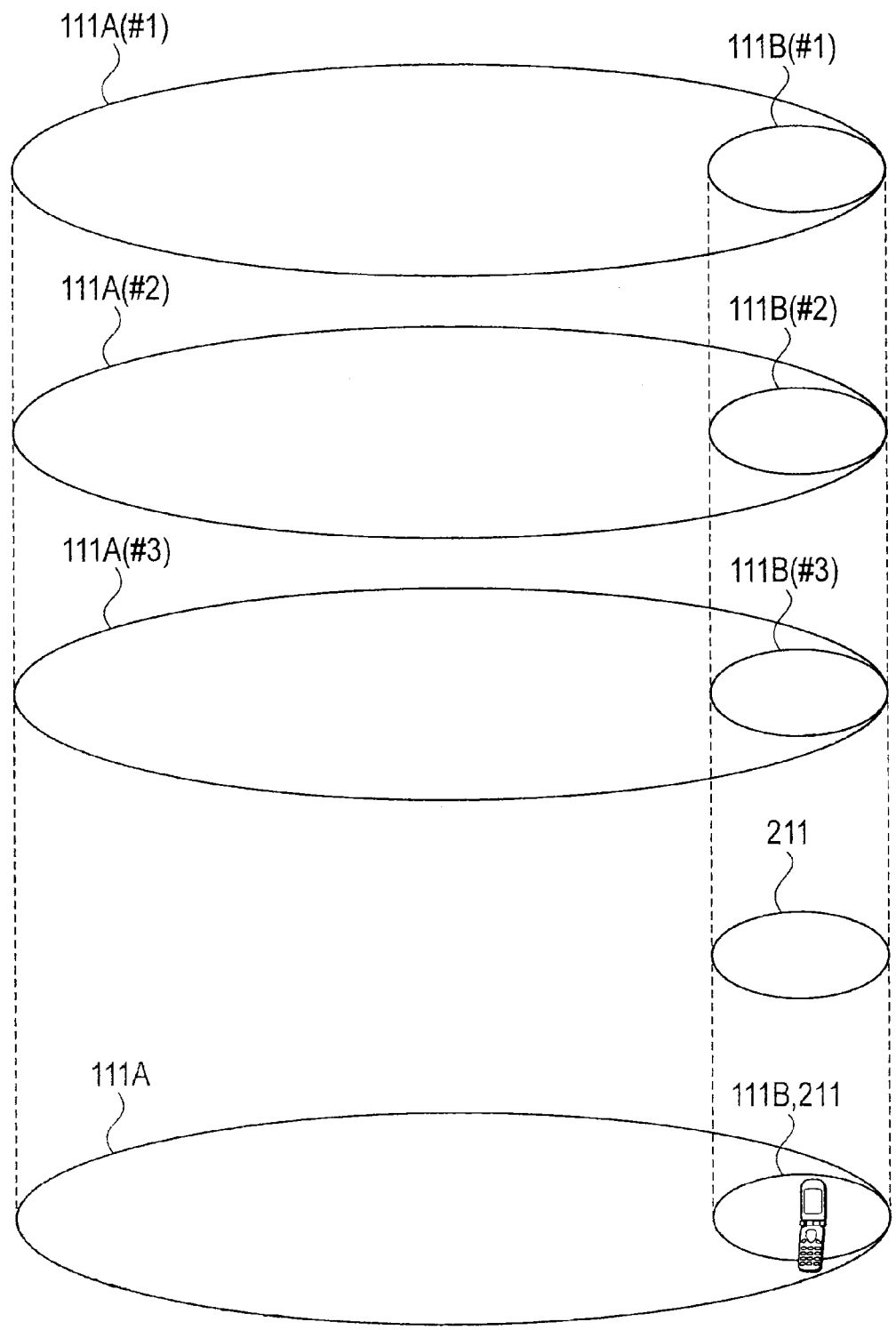
FIG. 2 is a diagram showing a configuration of cells according to the first embodiment.

Hereinafter, a description will be given of a configuration of cells according to the first embodiment with reference to the drawings. FIG. 2 is a diagram showing a configuration of cells according to the first embodiment.

In the first embodiment, a cell serves as a function for performing radio communications with a UE 10 and is identified by a frequency, a diffusion code or a time slot or the like. In addition, the cell is provided to the NB 110A, the pilot HNB 110B and the HeNB 210.

In the first embodiment, a case where the NB 110A has three first cells (first cell #1, first cell #2 and first cell #3) is illustrated. In addition, a case where the pilot HNB 110B has three specific cells (specific cell #1, specific cell #2 and specific cell #3) is illustrated, and a case where the HeNB 210 has a single second cell is illustrated.

As shown in FIG. 2, the service areas 111A of the first cells provided to the NB 110A have the same range. To be more specific, the service area 111A (#1) of the first cell #1, the service area 111A (#2) of the first cell #2 and the service area 111A (#3) of the first cell #3 have the same range.

The service areas 111B of the specific cells provided to the NB 110B have the same range. To be more specific, the service area 111B (#1) of the specific cell #1, the service area 111B (#2) of the specific cell #2, and the service area 111B (#3) of the specific cell #3 have the same range.

Here, each of the service areas 111B of the specific cells provided to the pilot HNB 110B has the same range as the service area 211 of the second cell provided to the HeNB 210. Specifically, each of the specific cells provided to the pilot HNB 110B has the same range as the service area 211 of the second cell provided to the HeNB 210, as the service area 111B.

In addition, the service area 211 of the second cell provided to the HeNB 210 is different from the service areas 111A of the first cells provided to the NB 110A. Note that, in the first embodiment, the service area 211 of the second cell provided to the HeNB 210 is smaller than the service areas 111A of the first cells provided to the NB 110A. However, the embodiment is not limited to this case.

Note that, the first cells provided to the NB 110A are each termed as a macrocell in some cases. The second cell provided to the HeNB 210 is termed as a femtocell, a CSG (Closed Subscriber Group) cell, a home cell or the like in some cases.

In addition, an access type specifying a UE 10 accessible to a cell provided to the HeNB 210 may be defined in the second cell provided to the HeNB 210. The access type is "Closed," "Hybrid," or "Open."

A "Closed" second cell (femtocell) is configured to allow access from only a specific UE 10 managed by the HeNB 210.

A "Hybrid" second cell (femtocell) is configured to allow high quality communications for a specific UE 10 managed by the HeNB 210 and is configured to allow best effort quality communications for the other UEs 10 not managed by the HeNB 210.

An "Open" second cell (femtocell) is configured to allow access from all UEs 10 as in the case of the first cells (macrocells). Note that, in the "Open" cell, no distinction is made for the difference in communication quality between UEs 10 depending on whether the UE 10 is managed by the HeNB 210 or not.

Note that, the access type may be "ACCESS CLASS BARRED," which prohibits access from a UE 10 for each access class or "CELL BARRED," which prohibits access from a UE 10 for each cell.

(Functional Block Configurations of Mobile Communication System and Mobile Communication Terminal)

Next, a description will be given of a functional block configuration of the mobile communication system. Specifically, the functional block configurations of the pilot HNB 110B and the RNC 120A will be described. In addition, the functional block configuration of the UE 10 will be described.

(1) Pilot HNB 110B

Figure 3:
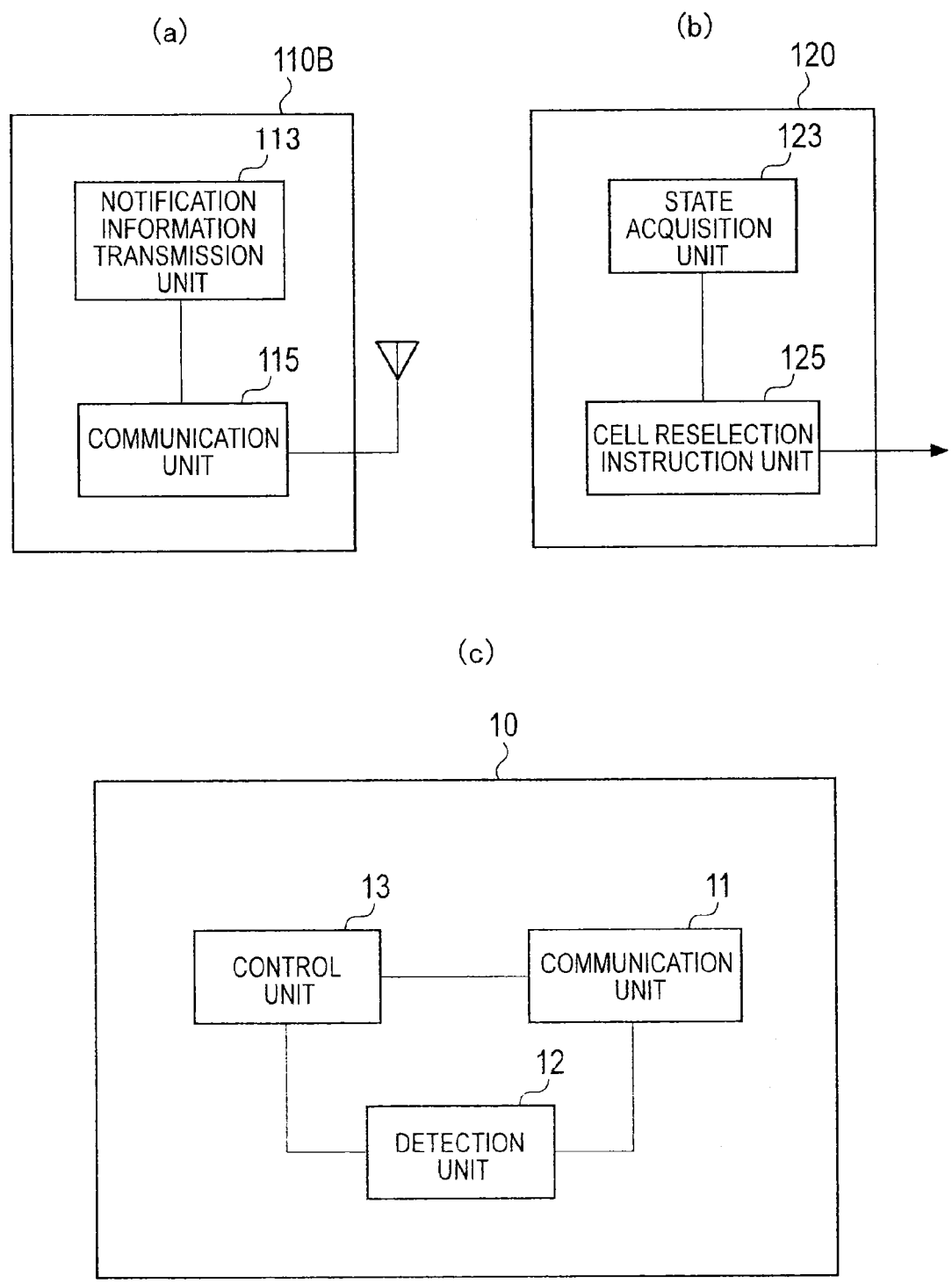
FIGS. 3(a) to 3(c) are functional block diagrams of a UE 10, a pilot HNB and an RNC 120A according to the first embodiment.

FIG. 3(*a*) is a functional block configuration diagram of the pilot HNB 110B according to the first embodiment. As shown in FIG. 3(*a*), the pilot HNB 110B includes a notification information transmission unit 113 and a communication unit 115.

Upon detection of a specific cell by a UE 10, the notification information transmission unit 113 transmits notification information for causing the UE 10 to start measurement of the second cell toward the service area 111B formed by the specific cell.

In addition, upon detection of a specific cell by a UE 10, the notification information transmission unit 113 transmits notification information including an information element required to cause the UE 10 to start cell reselection from the first cell to the second cell toward the service area 111B. Specifically, the notification information includes as the information element at least any of information indicating whether or not access to the specific cell is restricted (CSG Indicator/Indication), information identifying the specific cell (CSG Identity, Cell Identity), information identifying the second cell (Evolved CSG Identity, Cell Identity, Physical Cell Identity), and information instructing cell reselection to the second cell (Priority, EARFCN).

The communication unit 115 performs radio communications with a UE 10. Moreover, the communication unit 115 transmits the notification information transmitted by the notification information transmission unit 113 toward the service area 111B as a radio signal.

(2) RNC 120A

FIG. 3(*b*) is a functional block configuration diagram of the RNC 120A according to the first embodiment. As shown in FIG. 3(*b*), the RNC 120A includes a state acquisition unit 123 and a cell reselection instruction unit 125.

The state acquisition unit 123 acquires the state of a UE 10 via the pilot HNB 110B or the NB 110A. Specifically, the state acquisition unit 123 acquires a reception quality (Measurement Report) measured by the UE 10 on the basis of the notification information transmitted by the pilot HNB 110B.

The cell reselection instruction unit 125 instructs a UE to perform cell reselection of the UE 10 to another communication system (cell). Specifically, upon detection of a specific cell by a UE 10 while the UE 10 is in a connected state with a first cell, the cell reselection instruction unit 125 instructs the UE 10 to perform handover from the first cell to the second cell by a handover procedure.

(3) UE 10

FIG. 3(*c*) is a functional block configuration diagram of a UE 10 according to the first embodiment. As shown in FIG. 3(*c*), the UE 10 includes a communication unit 11, a detection unit 12 and a control unit 13.

The communication unit 11 performs radio communications with the NB 110A. Moreover, the communication unit 11 performs radio communications with the HeNB 210. In addition, the communication unit 11 receives notification information from the pilot home base station 110B.

The detection unit 12 detects a specific cell provided to the pilot home base station 110B. The detection unit 12 detects a specific cell by a signal (pilot channel, for example) broadcasted from a specific cell provided to the pilot home base station 110B, for example.

The control unit 13 integrally controls the UE 10. The control unit 13 controls cell reselection (cell selection or handover) between the first communication system and the second communication system, for example.

The UE 10 starts cell reselection from the first communication system (first cell managed by the NB 110A) to the second communication system (second cell managed by the HeNB 210) in response to detection of a specific cell managed by the pilot HNB 110B, for example.

Here, as the cell reselection from the first cell to the second cell, the following case is considered, for example.

(3.1) Case 1

The UE 10 starts cell reselection from the first cell to the second cell without using notification information broadcasted from a specific cell, while the UE 10 is in an idle state in the first cell.

Specifically, upon detection of a specific cell, the UE 10 identifies the frequency of the second cell previously stored in the UE 10 and performs measurement of a reception quality of a signal (pilot channel, for example) broadcasted from the second cell. If the reception quality of the signal broadcasted from the second cell satisfies a predetermined quality, the UE 10 starts cell reselection from the first cell to the second cell.

Note that, since the UE 10 performs the location registration in the first cell, intermittent reception (DRX) is used for identifying the frequency of the second cell. Specifically, the UE 10 searches for the frequency of the second cell during a period in which no signal from the first cell is monitored.

In addition, the RNC 120A (or the HeNB 210 or the HeNB-GW 220) determines on the basis of the reception quality reported from the UE 10 whether or not cell reselection from the first cell to the second cell is performed.

(3.2) Case 2

The UE 10 starts cell reselection from the first cell to the second cell in accordance with notification information broadcasted from a specific cell, while the UE 10 is in an idle state in the first cell.

In Case 2, the notification information broadcasted from a specific cell includes information indicating whether or not access to the specific cell is restricted (CSG Indicator/Indication), information identifying the specific cell (CSG Identity), information identifying the second cell (Evolved CSG Identity) and the like. In addition, the notification information may include information indicating priorities (Priority) of the first cell and the second cell as the information for guiding the cell reselection from the first cell to the second cell (Inter-RAT).

To put it more specifically, upon detection of a specific cell, the UE 10, first, identifies the frequency of a second cell having the same range as the service area of the specific cell in accordance with the notification information (CSG Identity or Priority, for example) broadcasted from the specific cell. Second, the UE 10 performs measurement of a reception quality of a signal (pilot channel, for example) broadcasted from the second cell. If the reception quality of the signal broadcasted from the second cell satisfies a predetermined quality, the UE 10 starts cell reselection from the first cell to the second cell.

Note that, since the UE 10 performs the location registration in the first cell, intermittent reception (DRX) is used for identifying the frequency of the second cell. Specifically, the UE 10 searches for the frequency of the second cell during a period in which no signal from the first cell is monitored.

In addition, the UE 10 may determine on the basis of the priorities (Priority) of the first cell and the second cell whether or not to perform cell reselection from the first cell to the second cell. Alternatively, the RNC 120A (or the HeNB 210 or the HeNB-GW 220) may determine on the basis of the reception quality reported from the UE 10 whether or not cell reselection from the first cell to the second cell is performed.

(3.3) Case 3

The UE 10 starts handover from the first cell to the second cell by a handover procedure without measuring a reception quality of a signal (pilot channel, for example) broadcasted from the second cell, while the UE 10 is in a connected state with the first cell. Note that, an assumption is made in Case 3 that the frequency of the specific cell is the same as the frequencies of the first cell (cell currently in communications) and the second cell.

Specifically, upon detection of a specific cell, the UE 10 reports a reception quality of a signal (pilot channel, for example) broadcasted from the specific cell, as a part of the handover procedure.

Note that, the RNC 120A (or the HeNB 210 or the HeNB-GW 220) determines on the basis of the reception quality reported from the UE 10 whether or not cell reselection from the first cell (or the specific cell) to the second cell is performed. To put it another way, since the frequency of the specific cell is the same as the frequency of the first cell, whether or not cell reselection from the first cell (or the specific cell) to the second cell is performed is determined on the basis of the reception quality of the signal (pilot channel, for example) broadcasted from the specific cell, instead of the reception quality of the signal (pilot channel, for example) broadcasted from the first cell.

Accordingly, it should be noted that "compressed mode" does not have to be applied in Case 3 because it is unnecessary to perform measurement of the reception quality of a signal (pilot channel, for example) broadcasted from the second cell.

(3.4) Case 4

The UE 10 performs measurement of a reception quality of a signal (pilot channel, for example) broadcasted from the second cell (different frequency measurement) and starts handover from the first cell to the second cell by a handover procedure, while the UE 10 is in a connected state with the first cell. Note that, an assumption is made in Case 4 that the frequency of the specific cell is the same as the frequency of the first cell (cell currently in communications).

Specifically, upon detection of a specific cell, the UE 10 reports a reception quality of a signal (pilot channel, for example) broadcasted from the specific cell. The RNC 120A (or the HeNB 210 or the HeNB-GW 220) determines on the basis of the reception quality of the specific cell reported from the UE 10 whether or not measurement of the frequency of the second cell (different frequency measurement) is started. If it is determined that different frequency measurement is started, the UE 10 performs measurement of a reception quality of a signal (pilot channel, for example) broadcasted from the second cell.

Note that, the RNC 120A (or the HeNB 210 or the HeNB-GW 220) determines on the basis of the reception quality of the second cell reported from the UE 10 whether or not cell reselection to the second cell is performed.

Note that, since the UE 10 performs communication by using the frequency of the first cell, "compressed mode" is used to identify the frequency of the second cell. To put it differently, the UE 10 searches for the frequency of the second cell during a period in which no signal from the first cell is monitored. In addition, the UE 10 performs measurement of the reception quality of the signal broadcasted from the second cell during a period in which no signal from the first cell is monitored.

Note that, in a case where notification information broadcasted from the specific cell is obtainable in Case 4, the UE 10 can identify the frequency of the second cell on the basis of the notification information broadcasted from the specific cell, without searching for the frequency of the second cell.

In addition, the RNC 120A (or the HeNB 210 or the HeNB-GW 220) may determine on the basis of the priorities (Priority) of the first cell and the second cell whether or not cell reselection from the first cell to the second cell is performed.

(Operation of Mobile Communication System)

Figure 4:
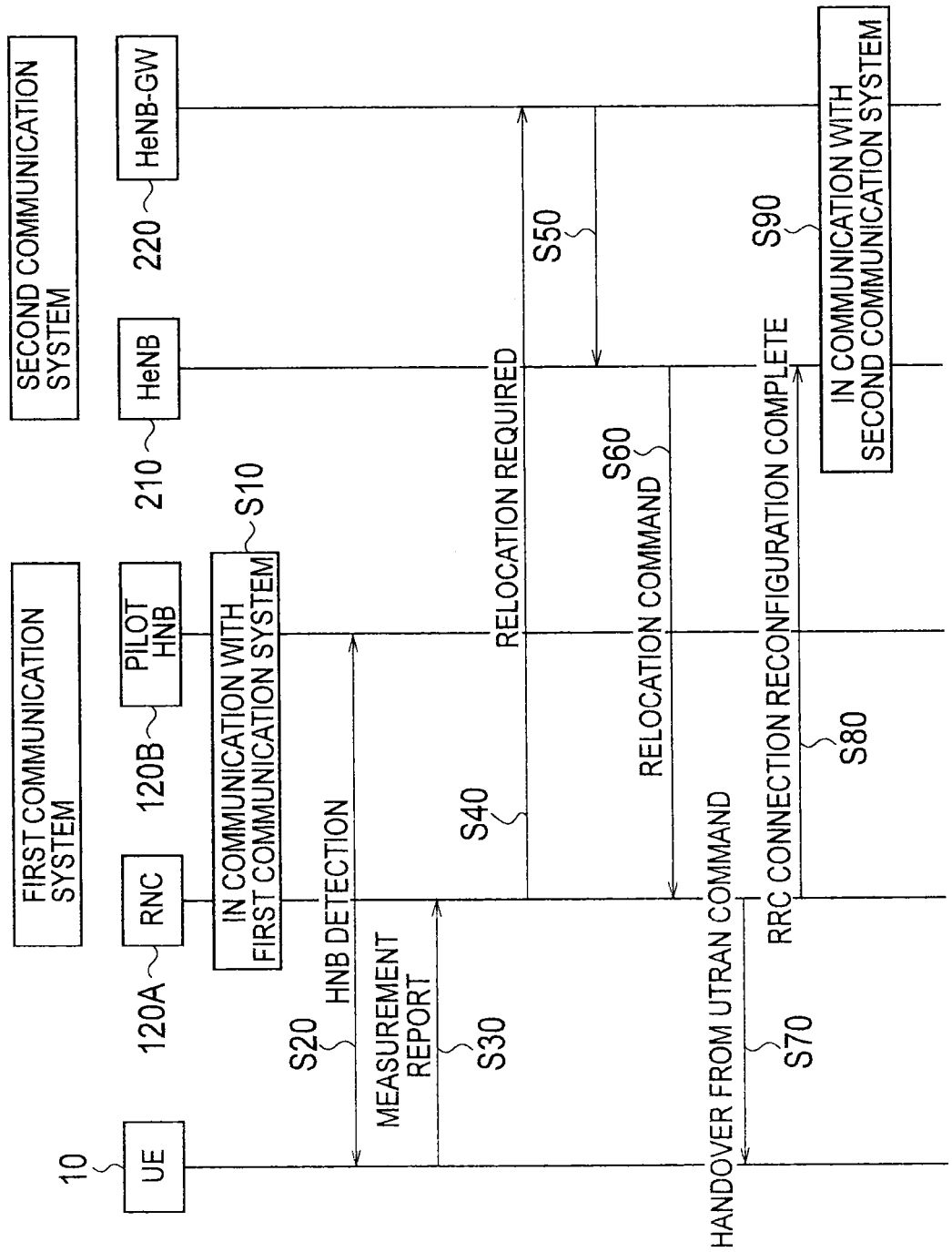
FIG. 4 is a sequence diagram showing operation of the mobile communication system 100 according to the first embodiment.

Hereinafter, a description will be given of operation of the mobile communication system according to the first embodiment with reference to the drawing. FIG. 4 is a sequence diagram showing the operation of the mobile communication system 100 according to the first embodiment. Here, the operation of the mobile communication system 100 will be described while Case (4) described above is cited as an example.

As shown in FIG. 4, the UE 10 performs communications with the RNC 120A via the first cell provided to the NB 110A in step 10.

In step 20, the UE 10 detects a specific cell provided to the pilot HNB 110B.

In step 30, the UE 10 identifies a frequency of a second cell and performs measurement (different frequency measurement) of the frequency of the second cell by using "compressed mode" in response to detection of the specific cell.

Subsequently, the UE 10 reports a reception quality of a signal (pilot channel, for example) (Measurement Report) broadcasted from the second cell, to the RNC 120A.

In step 40, the RNC 120A transmits information requesting cell reselection from the first cell to the second cell (RELOCATION REQUIRED) to the HeNB-GW 220.

In step 50, the HeNB-GW 220 forwards the information requesting cell reselection from the first cell to the second cell (RELOCATION REQUIRED) to the HeNB 210.

In step 60, the HeNB 210 transmits information instructing cell reselection from the first cell to the second cell (RELOCATION COMMAND) to the RNC 120A.

In step 70, the RNC 120A transmits information instructing cell reselection from the first cell to the second cell (HANDOVER FROM UTRAN COMMAND) to the UE 10.

In step 80, the RNC 120A transmits information indicating that cell reselection from the first cell to the second cell is completed (RRC CONNECTION RECONFIGURATION COMPLETE) to the HeNB 210.

In step 90, the UE 10 performs communications with the HeNB-GW 220 via the second cell provided to the HeNB 210.

(Operational Effects)

In the first embodiment, each of the specific cells provided to the pilot HNB 110B has the same range as the service area 211 of the second cell provided to the HeNB 210, as the service area 111B. The UE 10 starts measurement of the second cell provided to the HeNB 210 or cell reselection from a first cell provided to the NB 110A to the second cell provided to the HeNB 210, in response to detection of the specific cell. Accordingly, lengthy measurement of the second cell is prevented, and cell reselection between the first communication system (first cell) and the second communication system (second cell) can be appropriately performed while battery consumption is suppressed. In particular, efficient cell reselection of the UE 10 to the second cell can be achieved by providing a specific cell whose coverage overlaps with the coverage of the second cell in the vicinity of an entrance of a building or an apartment building to which the second cell (LTE cell) is provided. Moreover, it is possible to prevent the UE 10 from performing unnecessary measurement of a reception quality within the building or the apartment building.

In the first embodiment, in a case where notification information including information to specify a UE 10 that needs to perform cell reselection from the first cell to the second cell (CSG ID, for example) is broadcasted from the specific cells, there is no need for a UE 10 that does not have to perform cell reselection to the second cell to perform measurement of the frequency of the second cell. Accordingly, lengthy measurement of the second cell is prevented, and battery consumption can be suppressed.

(Variation 1)

Hereinafter, a description will be given of Variation 1 of the first embodiment with reference to the drawing. A difference from the first embodiment will be mainly described below.

Figure 5:
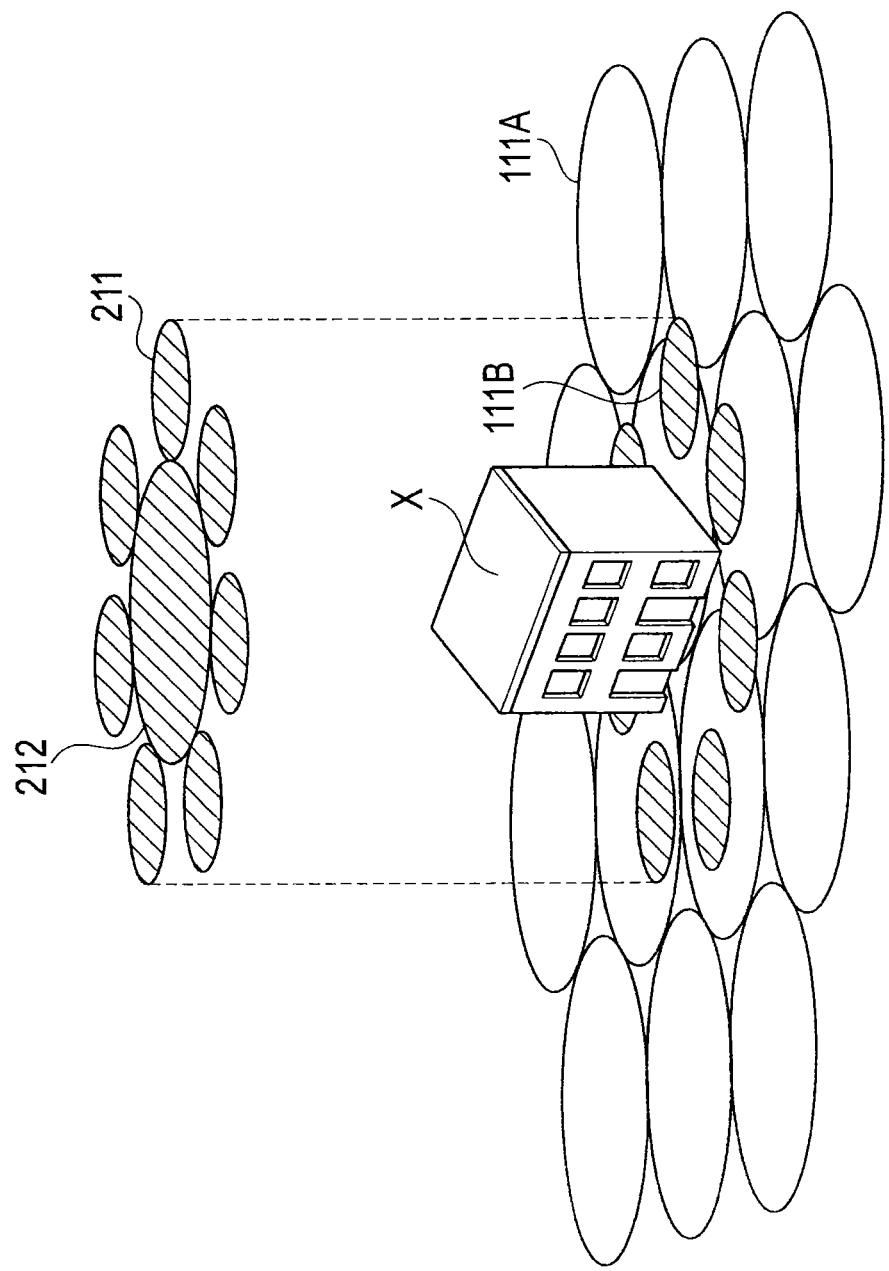
FIG. 5 is a diagram showing a configuration of a cell according to Variation 1.

Specifically, as shown in FIG. 5, multiple service areas 211 are provided around a service area 212 as the service areas supporting the second communication system in Variation 1. Note that, the service area 212 is an area that covers a building X such as a building or an apartment building, for example.

Moreover, as the service areas supporting the first communication system, multiple service areas 111A and multiple service areas 111B are provided. Each of the service areas 111B has the same range as each of the service areas 211.

Here, as in the case of the first embodiment, the UE 10 starts cell reselection to the second cell having the service area 211, in response to detection of a specific cell having the service area 111B.

Note that, the service area 211 may be provided only at an entrance of the building X such as a building or an apartment building.

(Operational Effects)

In Variation 1, the UE 10 starts cell reselection to the second cell having the service area 211, in response to detection of a specific cell having the service area 111B provided around the service area 212. Accordingly, in a case where it is desired that the second communication system be used in the building X, cell reselection from the first communication system (first cell) to the second communication system (second cell) can be appropriately performed while battery consumption is suppressed.

[Variation 2]

Hereinafter, a description will be given of Variation 2 of the first embodiment with reference to the drawing. A difference from the first embodiment will be mainly described below.

Figure 6:
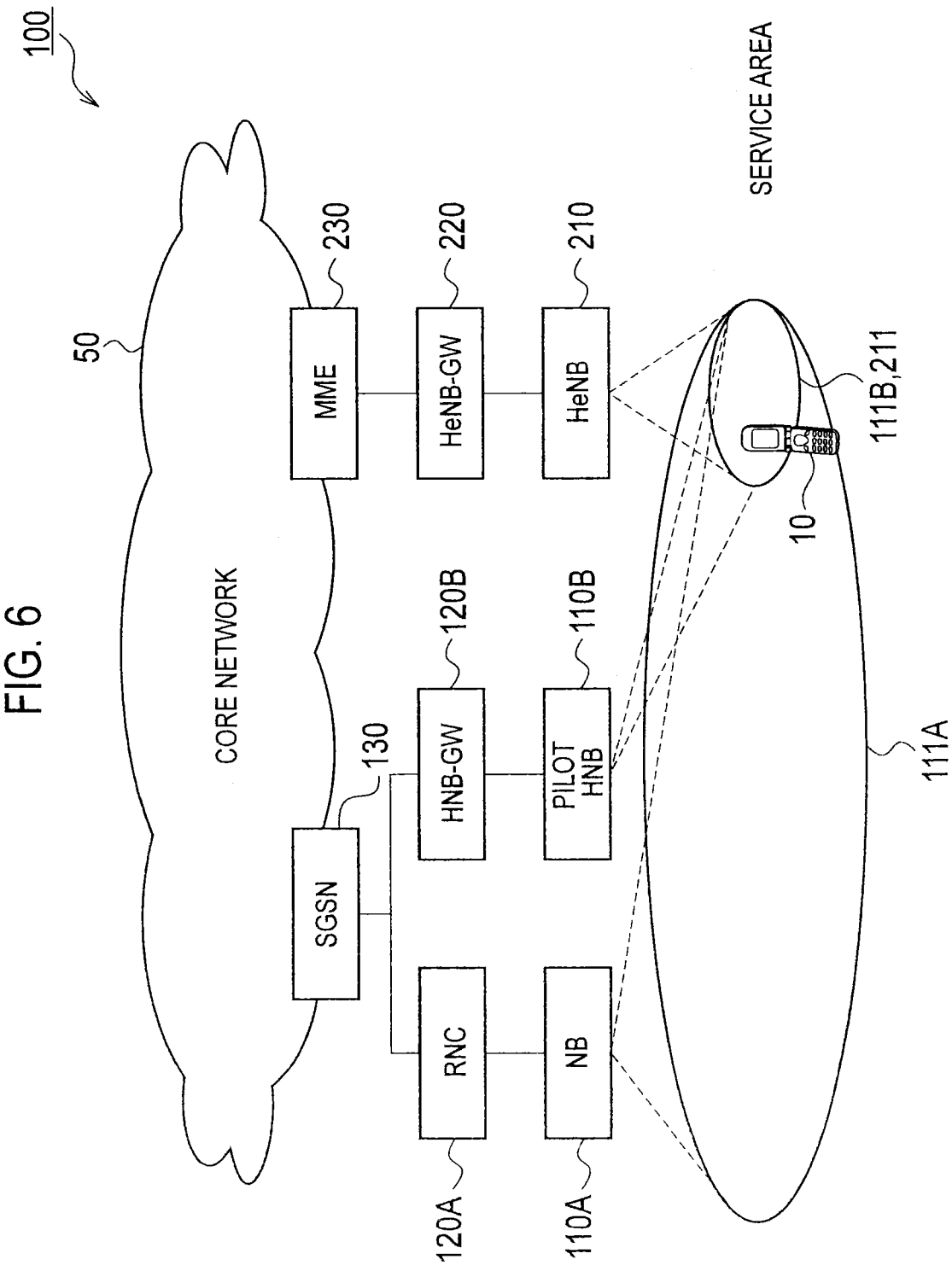
FIG. 6 is a diagram showing a mobile communication system 100 according to Variation 2.

Specifically, the upper level node of the pilot HNB 110B is the RNC 120A in the first embodiment. Meanwhile, as shown in FIG. 6, the upper level node of the pilot HNB 110B is a home base station gateway 120B (hereinafter, HNB-GW 120B) in Variation 2.

In Variation 2, the HNB-GW 120B manages the pilot HNB 110B instead of the RNC 120A. To put it differently, the HNB-GW 120B provides the same functions as those of the RNC 120A to a device that belongs under the HNB-GW 120B.

(Variation 3)

Hereinafter, a description will be given of Variation 3 of the first embodiment with reference to the drawings. A difference from the first embodiment will be mainly described below.

Figure 7:
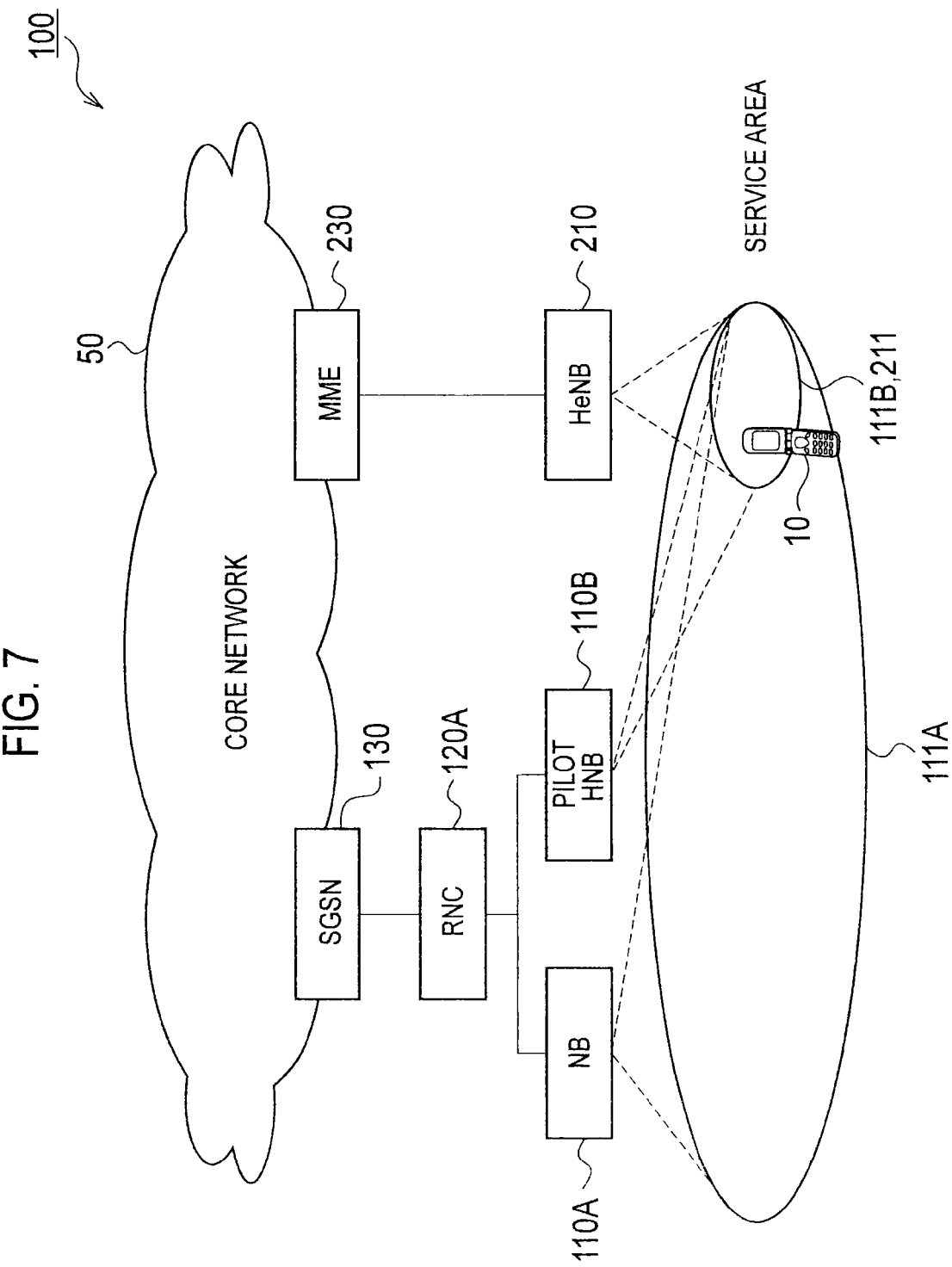
FIG. 7 is a diagram showing a mobile communication system 100 according to Variation 3.

Specifically, the upper level node of the HeNB 210 is the HeNB-GW 220 in the first embodiment. Meanwhile, as shown in FIG. 7, the upper level node of the HeNB 210 is the MME 230 in Variation 3. To put it in another way, the HeNB-GW 220 is omitted.

In Variation 3, the HeNB 210 or the MME 230 provides the functions included in the HeNB-GW 220. Alternatively, both of the HeNB 210 and the MME 230 provide the functions included in the HeNB-GW 220.

[Other Embodiments]

The present invention has been disclosed by using the embodiment described above in detail. However, it should not be understood that the description and drawings which constitute part of this disclosure limit the present invention. From this disclosure, various alternative embodiments, examples, and operation techniques will be easily found by those skilled in the art.

In the aforementioned embodiment, the first communication system is a communication system supporting UMTS, and the second communication system is a communication system supporting LTE. Specifically, the UE 10 starts cell reselection from UMTS to LTE in response to detection of a specific cell provided to UMTS. However, the embodiment is not limited to this case.

The first communication system may be a communication system supporting LTE, and the second communication system may be a communication system supporting UMTS, for example. In this case, a specific cell is provided to LTE. The UE 10 starts cell reselection from LTE to UMTS in response to detection of a specific cell provided to LTE.

Alternatively, specific cells may be provided to both of the communication system supporting UMTS and the communication system supporting LTE. In this case, the UE 10 starts cell reselection from UMTS to LTE in response to detection of a specific cell provided to UMTS and starts cell reselection from LTE to UMTS in response to detection of a specific cell provided to LTE.

Note that operation of the above described UE 10 may be implemented by means of hardware, a software module executed by a processor, or a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Additionally, the storage medium and the processor may be provided in an ASIC. The ASIC may be provided in the UE 10. Moreover, the storage medium and the processor may be provided in the UE 10 as a discrete component.

Note that, the entire content of Japanese Patent Application No. 2009-272446 (filed on Nov. 30, 2009) is incorporated herein by reference.

INDUSTRIAL APPLICABILITY

According to the present invention, it is possible to provide a mobile communication terminal, a mobile communication system and a mobile communication method each of which makes it possible to appropriately perform cell reselection between a first communication system and a second communication system while suppressing battery consumption. Thus, the mobile communication terminal, the mobile communication system and the mobile communication method are useful in radio communications and the like.

EXPLANATION OF REFERENCE NUMERALS

10 . . . communication terminal device, 11 . . . communication unit, 12 . . . detection unit, 13 . . . control unit, 110 . . . NB, 110B . . . pilot HNB, 111A . . . serving area, 111B . . . serving area, 113 . . . notification information transmission unit, 115 . . . communication unit, 120A . . . RNC, 120B . . . HNB-GW, 123 . . . state acquisition unit, 125 . . . cell reselection instruction unit, 130 . . . SGSN, 210 . . . HeNB, 220 . . . HeNB-GW, 230 . . . MME, 50 . . . core network, 100 . . . mobile communication system

The invention claimed is:

1. A mobile communication terminal configured to perform cell reselection between a first cell and a second cell in a mobile communication system including a first communication system having the first cell and a second communication system having the second cell, the mobile communication terminal comprising:
   circuitry configured to
     detect a specific cell provided to the first communication system; and
     start measurement of the second cell or cell reselection from the first cell to the second cell in response to detection of the specific cell, wherein
   the specific cell has a service area having the same range as a service area of the second cell,
   the specific cell and the second cell are provided by separate and distinct stand-alone devices,
   the specific cell is provided by a first device of the separate and distinct stand-alone devices, which is connected to a core network via a first node,
   the second cell is provided by a second device of the separate and distinct stand-alone devices and is connected to the core network via a second node, which is different from the first node,
   the first node provides connectivity to the core network according to a first communication standard, and
   the second node provides connectivity to the core network according to a second communication standard, which is different from the first communication standard.

2. The mobile communication terminal according to claim 1, wherein
   upon detection of the specific cell, the circuitry is configured to start cell reselection from
   the first cell to the second cell in accordance with notification information broadcasted from the specific cell, and
   the notification information includes information for prompting cell reselection from the first cell to the second cell.

3. The mobile communication terminal according to claim 1, wherein the circuitry is configured to perform handover from the first cell to the second cell by a handover procedure upon detection of the specific cell while the mobile communication terminal is in a connected state with the first cell.

4. A mobile communication system configured to control a mobile communication terminal connectable to a first communication system having a first cell and a second communication system having a second cell, wherein
   a specific cell provided to the first communication system has a service area having the same range as a service area of the second cell,
   the specific cell and the second cell are provided by separate and distinct stand-alone devices,
   the specific cell is provided by a first device of the separate and distinct stand-alone devices, which is connected to a core network via a first node,
   the second cell is provided by a second device of the separate and distinct stand-alone devices and is connected to the core network via a second node, which is different from the first node,
   the first node provides connectivity to the core network according to a first communication standard,
   the second node provides connectivity to the core network according to a second communication standard, which is different from the first communication standard, and
   the mobile communication system comprises circuitry configured to transmit notification information toward a service area formed by the specific cell provided to the first communication system, the notification information including an information element required for the mobile communication terminal to start measurement of the second cell or cell reselection from the first cell to the second cell.

5. The mobile communication system according to claim 4, wherein the circuitry is configured to instruct the mobile communication terminal to perform handover from the first cell to the second cell by a handover procedure upon detection of the specific cell by the mobile communication terminal while the mobile communication terminal is in a connected state with the first cell.

6. A mobile communication method for controlling a mobile communication terminal connectable to a first communication system having a first cell and a second communication system having a second cell, wherein a specific cell provided to the first communication system has the same range as a service area of the second cell as its service area, the specific cell and the second cell are provided by separate and distinct stand-alone devices, the specific cell is provided by a first device of the separate and distinct stand-alone devices, which is connected to a core network via a first node, the second cell is provided by a second device of the separate and distinct stand-alone devices and is connected to the core network via a second node, which is different from the first node, the first node provides connectivity to the core network according to a first communication standard, and the second node provides connectivity to the core network according to a second communication standard, which is different from the first communication standard, the method comprising the steps of:

transmitting notification information by a mobile communication system toward a service area formed by the specific cell provided to the first communication system, the notification information including an information element required for the mobile communication terminal to start measurement of the second cell or cell reselection from the first cell to the second cell; and starting by the mobile communication terminal, measurement of the second cell or cell reselection from the first cell to the second cell in response to detection of the notification information in the service area formed by the specific cell provided to the first communication system.

7. The mobile communication terminal according to claim 1, wherein
the specific cell is provided around the second cell having the service area.

8. The mobile communication terminal according to claim 1, wherein
the first communication system provides service according to the first communication standard, and
the second communication system provides service according to the second communication standard.

9. The mobile communication terminal according to claim 2, wherein
the notification information includes an information element indicating whether access to the specific cell is restricted.

10. The mobile communication terminal according to claim 2, wherein
the notification information includes an information element identifying the specific cell.

11. The mobile communication terminal according to claim 2, wherein
the notification information includes an information element identifying the second cell.

* * * * *